(12) United States Patent
Negrin

(10) Patent No.: US 6,406,762 B1
(45) Date of Patent: Jun. 18, 2002

(54) MULTI-PANEL GLASS UNIT HAVING AN ENCLOSED VIEW CONTROL COMPONENT AND A METHOD FOR MAKING SAME

(75) Inventor: Eugene M. Negrin, Livingston, NJ (US)

(73) Assignee: The Galaxy Corporation, Fairfield, NJ (US)

( * ) Notice: Subject to any disclaimer, the term of this patent is extended or adjusted under 35 U.S.C. 154(b) by 0 days.

(21) Appl. No.: 09/479,187

(22) Filed: Jan. 7, 2000

(51) Int. Cl.[7] .............................. E06B 3/24; C03C 27/00
(52) U.S. Cl. ...................... 428/34; 156/109; 156/272.2; 156/275.5; 52/786.11
(58) Field of Search ................ 428/34, 919; 52/786.11, 52/786.13, 204, 593; 430/5; 156/107, 109, 272.2, 275.5; 264/494

(56) References Cited

U.S. PATENT DOCUMENTS

| 3,406,085 A | * | 10/1968 | Brown et al. | |
| 3,741,652 A | * | 6/1973 | Brock et al. | ................... 428/34 |
| 5,653,839 A | * | 8/1997 | Itoh et al. | ................... 156/109 |

* cited by examiner

Primary Examiner—Donald J. Loney
(74) Attorney, Agent, or Firm—Goodwin Procter LLP

(57) ABSTRACT

There is provided a glass unit and the process for making the same comprising at least two sheets of glass having an enclosed view control component, a spacer applied to the peripheries of the two sheets of glass to form a space between the two sheets of glass and a ultra-violet light activated photopolymer uniformly dispersed throughout the space formed between the two sheets of glass.

16 Claims, 1 Drawing Sheet

Figure 1:
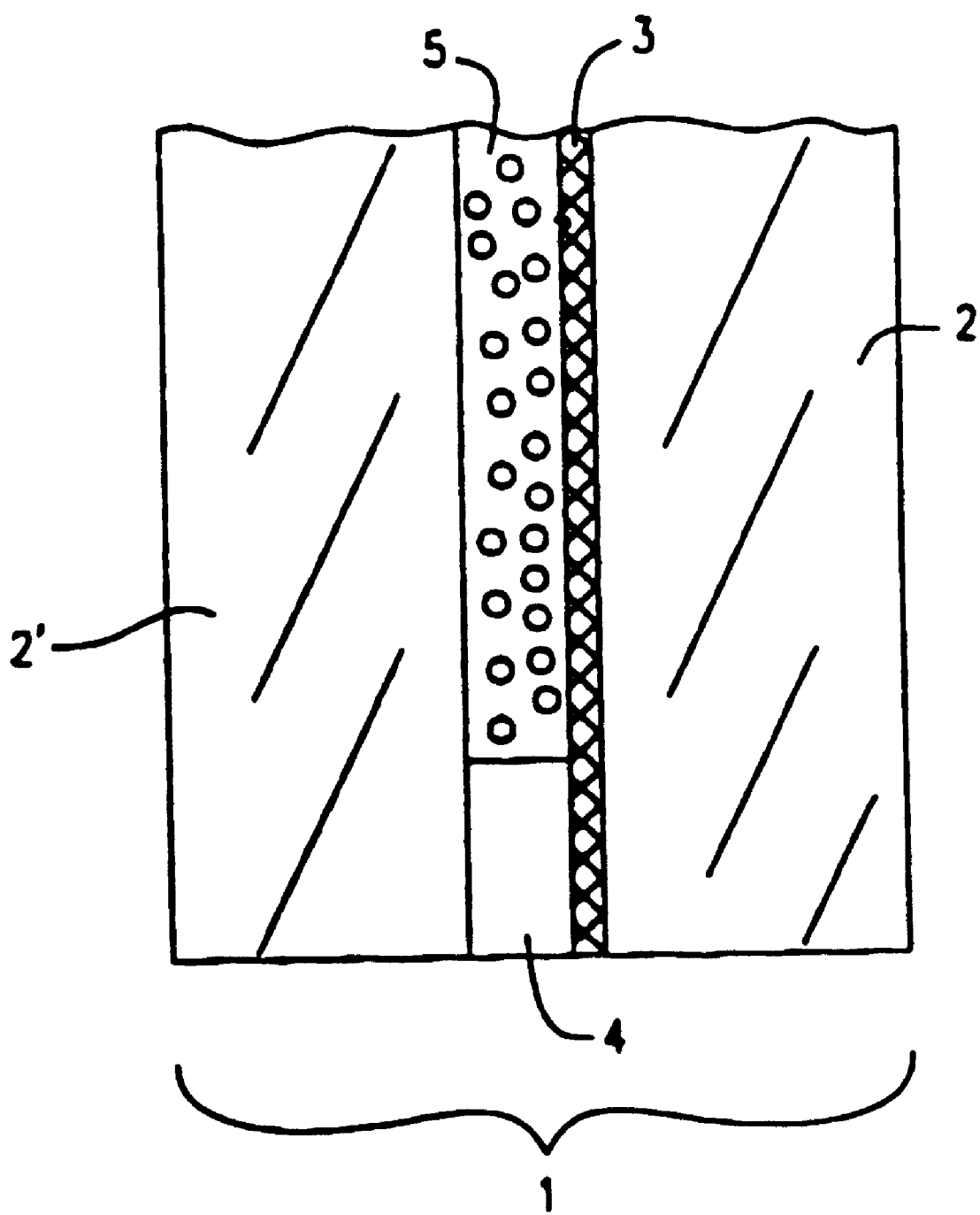

MULTI-PANEL GLASS UNIT HAVING AN ENCLOSED VIEW CONTROL COMPONENT AND A METHOD FOR MAKING SAME

BACKGROUND OF THE INVENTION

1. Field of Invention

The present invention relates generally to multi-paneled glass substrates and more particularly to a multi-paneled glass unit having an enclosed view control component and a process for making the same.

2. Brief Description of the Prior Art

Single or monolithic glass units and multi-paneled glass units whereby a view control component, such as a film, is applied to the outer surface of the glass unit is known in the art. However, because the view control component is applied to the outer surface of the single or multi-paneled glass glazing, the view control component is subjected to adverse conditions, for example, contaminants, cleaning solutions, abrasive contacts and the like, thereby reducing the product life of the glass unit. Thus, heretofore, existing architectural glass units lacked durability, uniformity in appearance and easy maintenance.

SUMMARY OF THE INVENTION

The present invention is directed to a glass unit and process of making same that satisfies this need for a durable, longer lasting multi-paneled glass unit. By enclosing the view control component of the laminated glass unit between at least two glass panels or sheets comprising the multi-paneled glass unit, the glass unit is shielded from atmospheric contaminants, cleaning solutions, abrasive contacts and other damaging substances.

In accordance with one embodiment of the present invention, there is provided a glass unit comprising at least two sheets of glass having a view control component interposed therebetween; a spacer applied to the peripheries of at least two sheets of glass to form a space between at least two sheets of glass; and an ultra-violet light activated photopolymer injected and uniformly dispersed throughout the space formed between at least two sheets of glass.

In accordance with another embodiment of the present invention there is further provided a multi-paneled glass unit wherein at least two glass sheets is annealed glass.

In accordance with another embodiment of the present invention there is further provided a multi-paneled glass unit wherein the spacer is double-sided acrylic tape having a pressure sensitive adhesive mechanism.

In accordance with another embodiment of the present invention there is further provided a multi-paneled glass unit wherein the ultra-violet light activated photopolymer comprises methyl methacrylate, acrylate oligomer, acrylate siloxane and silicone.

In accordance with another embodiment of the present invention there is further provided a multi-paneled glass unit wherein the ultra-violet light activated photopolymer comprises methyl methacrylate, 62–22% by weight, acrylate oligomer, 70–40% by weight, acrylate siloxane, 1% by weight and silicone, 1% by weight.

In accordance with another embodiment of the present invention there is further provided a multi-paneled glass unit wherein the multi-paneled glass unit is irradiated for 20 minutes to 6 hours.

In accordance with another embodiment of the present invention there is further provided a multi-paneled glass unit wherein the multi-paneled glass unit is irradiated for 20 minutes.

In accordance with an embodiment of the present invention there is provided a method for producing a multi-paneled glass unit, comprising the steps of providing at least two sheets of glass; positioning a view control component between said at least two sheets of glass; applying a spacer at the peripheries of and between the at least two sheets of glass; aligning and affixing the at least two sheets of glass together thereby forming a glass unit having a space between said at least two sheets of glass; filling the space formed between said at least two sheets of glass with an ultra-violet light activated photoploymer; and irradiating the multi-paneled glass unit using ultra-violet light.

These and other features, aspects, and advantages of the present invention will become better understood with regard to the following description, appended claims, and accompanying drawings.

BRIEF DESCRIPTION OF THE DRAWING(S)

FIG. 1 shows a fragmentary sectional side view of one embodiment of the present invention.

DETAILED DESCRIPTION OF THE DRAWING(S)

FIG. 1 is a fragmentary sectional view of one embodiment of the present invention. In this figure, 1 is the multi-paneled glass unit, 2 and 2' are each a sheet of glass; 3 is a view control component, 4 is a spacer; and 5 is a photopolymer.

DETAILED DESCRIPTION OF THE PREFERRED EMBODIMENT

A. Overview

The multi-paneled glass unit of the present invention comprises at least two sheets of glass and a layer of view control component positioned therebetween, a spacer applied to the peripheries of the at least two sheets of glass that forms a space between the at least two sheets of glass, and a ultra-violet light activated photopolymer having been injected and uniformly dispersed throughout the space formed between the at least two sheets of glass.

A process of making a multi-paneled glass unit of the present invention comprises the steps of, providing at least two sheets of glass, adhesively positioning a view control component between the at least two sheets of glass, providing a spacer at the peripheries of the at least two sheets of glass via an adhesive, aligning and securely affixing the at least two sheets of glass together to form a space between the at least two sheets of glass, injecting and filling the space formed by the at least two sheets of glass with a composition comprising an ultra-violet light activated photopolymer, and curing the resultant multi-paneled glass unit using ultra-violet radiation.

B. Detailed Description of the Preferred Method of Production

For illustration purposes, one embodiment of the present invention using two glass sheets or panels is preferably made in the following manner. Before continuing it should be noted however, that the invention is not limited thereby as the present invention is directed to a multi-paneled glass unit and therefore, more than two glass sheets or panels may be used.

One sheet of glass is cut a predetermined shape and size. Preferably, clear annealed glass is used because of its extreme flatness but any other type of glass can be used. The thickness of the sheet can range between ⅛" to 1" or more with a ¼" the preferable thickness.

The glass sheet is cleaned of surface contaminants such as water stains, moisture, soap residue, cutting oils, dust and/or any airborne particles. Various cleaning methods can be employed. Preferably, the glass should be cleaned using an industrial glass washer with a minimum of six (6) brushes to ensure that all surface contaminants are removed. However, among other methods, the glass can also be cleaned by hand with glass detergents and safety razor blades.

The now cleaned glass enters a Clean Room Environment. The glass is then fed in a horizontal position into a pinch roll applicator. Next, a layer of view control component having an adhesive with a protective backing is applied to the sheet of glass by means of the pinch roll component applicator. The view control component's adhesive coating provides for ease in application.

The pinch roll applicator is equipped with an anti-static bar and an uptake spool. In use, the anti-static bar prevents ambient airborne particles from alighting on the first sheet of glass prior to application of the layer of view control component to the glass. The uptake spool collects the protective backing of the view control component as it separates from the primary component. The view control component is then temporarily affixed to the glass via the component's adhesive resulting in a glass-view control unit.

At this stage, the glass-view control unit will be exposed to ultra-violet light. Preferably, the glass-view control unit will proceed via conveyor through an Ultra Violet Curing chamber to cure the adhesive portion of the view control component. Therein, the glass-view control unit will be exposed to ultraviolet radiation for about 45 minutes to 1 hour and 45 minutes, preferably 1 hour. The ultraviolet wavelength is between 320 to 440 nanometers, preferably 350 nanometers. The curing process ensures a good bond between the view control component and the glass sheet.

The cured glass-view control unit is fastened to a pneumatic tilt/castor fabrication table. The table is designed to tilt in butterfly fashion from a horizontal to a near vertical position.

A second sheet of glass, preferably cut the same predetermined size as the first glass sheet of the glass-view control unit, is also cleaned to remove surface contaminants. The second sheet of glass is not required to be the same thickness as the first.

After cleaning, the second sheet of glass is fastened to another pneumatic tilt/castor fabrication table. The second pneumatic tilt castor fabrication table is positioned in the working area, opposite the first pneumatic tilt castor fabrication table, so that the second glass sheet and the cured glass-view control unit are able to tilt toward each other in the butterfly fashion to the near vertical.

Double-sided acrylic tape, preferably having a pressure sensitive adhesive mechanism is preferably applied around the perimeter of the cured glass-view control unit so as to act as a dam or spacer, thus creating a glass-view control-tape unit. Note, at this point the double-sided acrylic tape need not be applied to the glass-view control unit. The tape can just as well be applied to the perimeter of the second sheet and still effectively act as a dam or spacer between the two sheets of glass.

The first and second pneumatic tilt/castor fabrication tables are then adjusted so that the second sheet is transferred to the fabrication table that holds the glassview control-tape unit in the near-vertical orientation. By making the transfer in the. near vertical position, the second sheet and the glass-view control-tape unit can be easily matched. The second sheet and the cured glass-view control-tape unit are then adjusted for correct alignment, tilted to the horizontal position and passed back through the pinch rollers. This pass through activates the pressure sensitive adhesive mechanism within the double-sided tape, forming a multi-paneled glass unit.

The multi-paneled glass unit is then transferred and fastened to a pneumatic tilt/castor fabrication table and tilted from the horizontal to the near-vertical position. Then, a single-component, ultra-violet light-activated methyl-methacrylated photopolymer is injected between the two sheets of the secured multi-paneled glass unit via a small gap in the perimeter tape to fill in the space or gap between the two sheets of glass. The preferred composition of the ultra-violet light activated photopolymer comprises methyl methacrylate, acrylate oligomer, acrylate siloxane and modified silicone, but the invention is not limited thereby. In the material composition for the photoploymer, the proportion of methyl methacrylate is 62–22% by weight, the proportion of acrylate oligomer is 70–40% by weight, the proportion of acrylate siloxane is 1% by weight, and the proportion of modified silicone is 1% by weight.

When the correct volume of the methylmethacrylated photopolymer has been injected to sufficiently fill the gap, the pneumatic tilt/castor table fabrication is tilted to the horizontal position, so as to permit the methylmethacrylated photopolymer to equalize itself and form a uniform interlayer.

The photopolymer-filled glass unit is transferred to the Ultra Violet Curing chamber and irradiated with ultraviolet light at a wavelength between 350 and 360 nanometers for about twenty (20) minutes to about six (6) hours, with 20 minutes being the preferred time interval. When the photopolymer is exposed to ultraviolet light, free radicals within the photopolymer become excited and initiate a chain of cross linking molecules. This cross linking of molecules will form a permanent bond between the substrates. After the curing process is completed a finished glass unit is produced which is ready for use.

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention as defined by the appended claims and equivalents thereto.

What is claimed is:

1. A multi-paneled glass unit comprising:
   (a) a view control component;
   (b) at least to sheets of glass having the view control component positioned therebetween;
   (c) a spacer applied to the peripheries of the at least two sheets of glass form a space between the at least two sheets of glass; and
   (d) an ultra-violet light activated photopolyner injected in the space formed between the at least two sheets of glass.

2. The multi-paneled glass unit of claim 1 wherein the at least two glass sheets is annealed glass.

3. The multi-paneled glass unit of claim 1 wherein the spacer is double-sided acrylic tape.

4. The multi-paneled glass unit of claim 3 wherein the double-sided acrylic tape comprises a pressure sensitive adhesive mechanism.

5. The multi-paneled glass unit of claim 1 wherein the ultra-violet light activated photopolymer comprises methyl methacrylate, acrylate oligomer, acrylate siloxane and silicone.

6. The multi-paneled glass unit of claim 1 wherein the ultra-violet light activated photopolymer comprises methyl methacrylate, about 62–22% by weight, acrylate oligoner, about 70–40% by weight, acrylate siloxane, about 1% by weight and silicone, about 1% by weight.

7. The multi-paneled glass unit of claim 1 wherein the multi-paneled glass unit is irradiated for about 20 minutes to about 6 hours.

8. The multi-paneled glass unit of claim 1 wherein the multi-paneled glass unit is irradiated for 20 minutes.

9. A method of making a multi-paneled glass unit, comprising the steps of:

(a) positioning a view control component between at least two sheets of glass;

(b) applying a spacer at the peripheries of and between the at least two sheets of glass;

(c) aligning and affixing the at least two sheets of glass together thereby forming a glass unit having a space between said at least two sheets of glass;

(d) filling the space formed between said at least two sheets of glass with an ultra-violet flight activated photopolymer; and (e) irradiating the multi-paneled glass unit using ultra-violet light.

10. The method as in claim 9 wherein the at least two glass sheets is annealed glass.

11. The method of claim 9 wherein the spacer is double-sided acrylic tape.

12. The method of claim 11 wherein the double-sided acrylic tape comprises a pressure sensitive adhesive mechanism.

13. The method of claim 9 wherein the ultra-violet light activated photopolymer comprises methyl methacrylate, acrylate oligomer, acrylate siloxane and silicone.

14. The method of claim 9 wherein the ultra-violet light activated photopolymer comprises methyl methacrylate, about 62–22% by weight, acrylate oligomer, about 70–40% by weight, acrylate siloxane, about 1% by weight and silicone, about 1% by weight.

15. The method of claim 9 further comprising the step of irradiating the multi-paneled glass unit for about 20 minutes to about 6 hours.

16. The method of claim 9 further comprising the step of irradiating the multi-paneled glass unit for about 20 minutes.

* * * * *

UNITED STATES PATENT AND TRADEMARK OFFICE
CERTIFICATE OF CORRECTION

PATENT NO.   : 6,406,762 B1
DATED        : June 18, 2002
INVENTOR(S)  : Negrin

It is certified that error appears in the above-identified patent and that said Letters Patent is hereby corrected as shown below:

<u>Column 3,</u>
Line 62, delete "." after the second "the".

<u>Column 4,</u>
Line 49, replace "to" with -- two --
Line 52, insert -- to -- in between "glass form"
Line 54, replace "photopolyner" with -- photopolymer --

<u>Column 5,</u>
Line 3, replace "oligoner" with -- oligomer --
Line 22, replace "flight" with -- light --

Signed and Sealed this

Twenty-first Day of January, 2003

JAMES E. ROGAN
*Director of the United States Patent and Trademark Office*